United States Patent
Gilling et al.

(10) Patent No.: US 9,902,339 B2
(45) Date of Patent: Feb. 27, 2018

(54) RETRACTABLE STORAGE APPARATUS

(71) Applicant: Toyota Motor Engineering & Manufacturing North America, Inc., Erlanger, KY (US)

(72) Inventors: Earnee J. Gilling, Ypsilanti, MI (US); Jonathan C. Hall, Ann Arbor, MI (US); Cassandra R. Grant, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 4 days.

(21) Appl. No.: 15/013,200

(22) Filed: Feb. 2, 2016

(65) Prior Publication Data
US 2017/0217381 A1   Aug. 3, 2017

(51) Int. Cl.
*B60R 11/02* (2006.01)
*B60R 11/00* (2006.01)

(52) U.S. Cl.
CPC ...... *B60R 11/0241* (2013.01); *B60R 11/0258* (2013.01); *B60R 2011/0005* (2013.01); *B60R 2011/0007* (2013.01); *B60R 2011/0049* (2013.01); *B60R 2011/0082* (2013.01)

(58) Field of Classification Search
CPC ............. B60R 11/0241; B60R 11/0258; B60R 2011/0082; B60R 2011/0007; B60R 2011/0049; B60R 2011/0005
USPC ................ 296/37.12, 37.8, 24.34, 1.09, 37.1
See application file for complete search history.

(56) References Cited

U.S. PATENT DOCUMENTS

| | | | |
|---|---|---|---|
| 5,556,017 A | 9/1996 | Troy | |
| 5,996,866 A * | 12/1999 | Susko | B60R 11/0241 224/281 |
| 6,056,175 A * | 5/2000 | Mieglitz | B60K 37/04 224/282 |
| 7,188,882 B2 | 3/2007 | Day | |
| 7,413,229 B2 | 8/2008 | Kukucka et al. | |
| 7,469,951 B2 | 12/2008 | Welschholz et al. | |
| 8,172,293 B2 | 5/2012 | Lota et al. | |
| 8,646,824 B2 | 2/2014 | Da Costa Pito et al. | |
| 8,807,621 B2 | 8/2014 | Stephan | |
| 9,302,629 B1 * | 4/2016 | Hall | B60R 11/0241 |
| 2009/0152418 A1 * | 6/2009 | Bury | B60R 11/0235 248/205.3 |

(Continued)

*Primary Examiner* — Jason S Morrow
*Assistant Examiner* — E Turner Hicks
(74) *Attorney, Agent, or Firm* — Dinsmore & Shohl LLP

(57) ABSTRACT

Embodiments of a retractable storage apparatus are described. Some embodiments include a hinge component, a back support disposed on a first side of the hinge component, and a lower support disposed on the first side of the hinge component. Some embodiments include an anchor component that is disposed on a second side of the hinge component, where when the retractable storage apparatus is disengaged, the back support, the lower support, and the anchor component are substantially coplanar and disposed within a mechanism cavity. Similarly, in some embodiments, in response to receiving a force directed into the mechanism cavity, the retractable storage apparatus is engaged such that the back support and the lower support extend from the mechanism cavity to expose the back support and the lower support and the back support and the lower support rotate on the hinge component to receive a mobile device.

20 Claims, 5 Drawing Sheets

(56) References Cited

U.S. PATENT DOCUMENTS

2012/0049558 A1* 3/2012 Souillac .................. B60R 11/00
                                                                                     296/37.12
2014/0203585 A1* 7/2014 Sofield .................... B60R 11/02
                                                                                     296/37.12

* cited by examiner

RETRACTABLE STORAGE APPARATUS

TECHNICAL FIELD

Embodiments described herein generally relate to a retractable storage apparatus and, more specifically, to an in-console or in-dash device holder for a mobile device.

BACKGROUND

Currently, there are many different vehicle-based holders for cell phones and other mobile devices. Most after-market holders are configured to stick to the dashboard or windshield of the vehicle. These types of mobile device holders can protrude from the dash and be placed in locations that get in the way of a driver's operation of the vehicle. Accordingly, a need exists in the industry.

SUMMARY

Embodiments of a retractable storage apparatus are described. Some embodiments include a hinge component, a back support disposed on a first side of the hinge component, and a lower support disposed on the first side of the hinge component. Some embodiments include an anchor component that is disposed on a second side of the hinge component, where when the retractable storage apparatus is disengaged, the back support, the lower support, and the anchor component are substantially coplanar (and/or substantially parallel) and disposed within a mechanism cavity. In some embodiments, in response to receiving a force directed into the mechanism cavity, the retractable storage apparatus is engaged such that the back support and the lower support extend from the mechanism cavity to expose the back support and the lower support. The back support and the lower support may additionally rotate on the hinge component to receive a mobile device.

In another embodiment, a retractable storage apparatus includes a hinge component, a back support coupled to the hinge component, and a lower support that is coupled to the hinge component. Some embodiments include an anchor component that is coupled to the hinge component and a retraction mechanism for engaging and disengaging the retractable storage apparatus. When the retractable storage apparatus is disengaged, the back support, the lower support, and the anchor component may be substantially coplanar and disposed within a mechanism cavity. Some embodiments include a user input device that is coupled to the retraction mechanism, where, in response to receiving user input to engage the retractable storage apparatus, the back support and the lower support extend from the mechanism cavity and the back support and the lower support rotate on the hinge component to receive a mobile device.

In yet another embodiment, a vehicle includes a vehicle dashboard, a vehicle console, and a retractable storage apparatus that is coupled to the vehicle dashboard and/or the vehicle console. In some embodiments the retractable storage apparatus includes a hinge component, a back support coupled to the hinge component, and a lower support that is coupled to the hinge component. In some embodiments the retractable storage apparatus includes an anchor component that is coupled to the hinge component, retractable side supports that are coupled to the back support, and a retraction mechanism for engaging and disengaging the retractable storage apparatus. When the retractable storage apparatus is disengaged, the back support, the lower support, and the anchor component may be substantially coplanar and disposed within a mechanism cavity of the vehicle. In still some embodiments, the retractable storage apparatus includes a user input device that is coupled to the retraction mechanism, where, in response to receiving user input to engage the retractable storage apparatus, the back support and the lower support extend from the mechanism cavity, the back support and the lower support rotate on the hinge component, and the retractable side supports extend to receive a mobile device.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments of a retractable storage apparatus are disclosed herein. Some embodiments may include an integrated retractable storage apparatus that may be installed into the dashboard or console of a vehicle in a location that is away from predetermined primary impact zones. The retractable storage apparatus can be retracted into the dashboard (or console) when not in use, with a back support and a lower support being substantially coplanar with and disposed on a first side of a hinge component. An anchor component may also be coplanar with the lower support, the back support, and the hinge, but may be disposed on a second side of the hinge. The back support and the lower support may be located on a first side of the hinge component and the anchor component may be located on a second side of the hinge component. To engage, the holder may be pressed further into the dash and released to extend the holder from the dashboard for use. When this occurs, the back support and the lower support may rotate on the hinge to fan out to receive a mobile device. The retractable storage apparatus may also include a wireless and/or wired charging unit for charging the mobile device. Embodiments of the retractable storage apparatus incorporating the same will be described in more detail, below.

Figure 1:
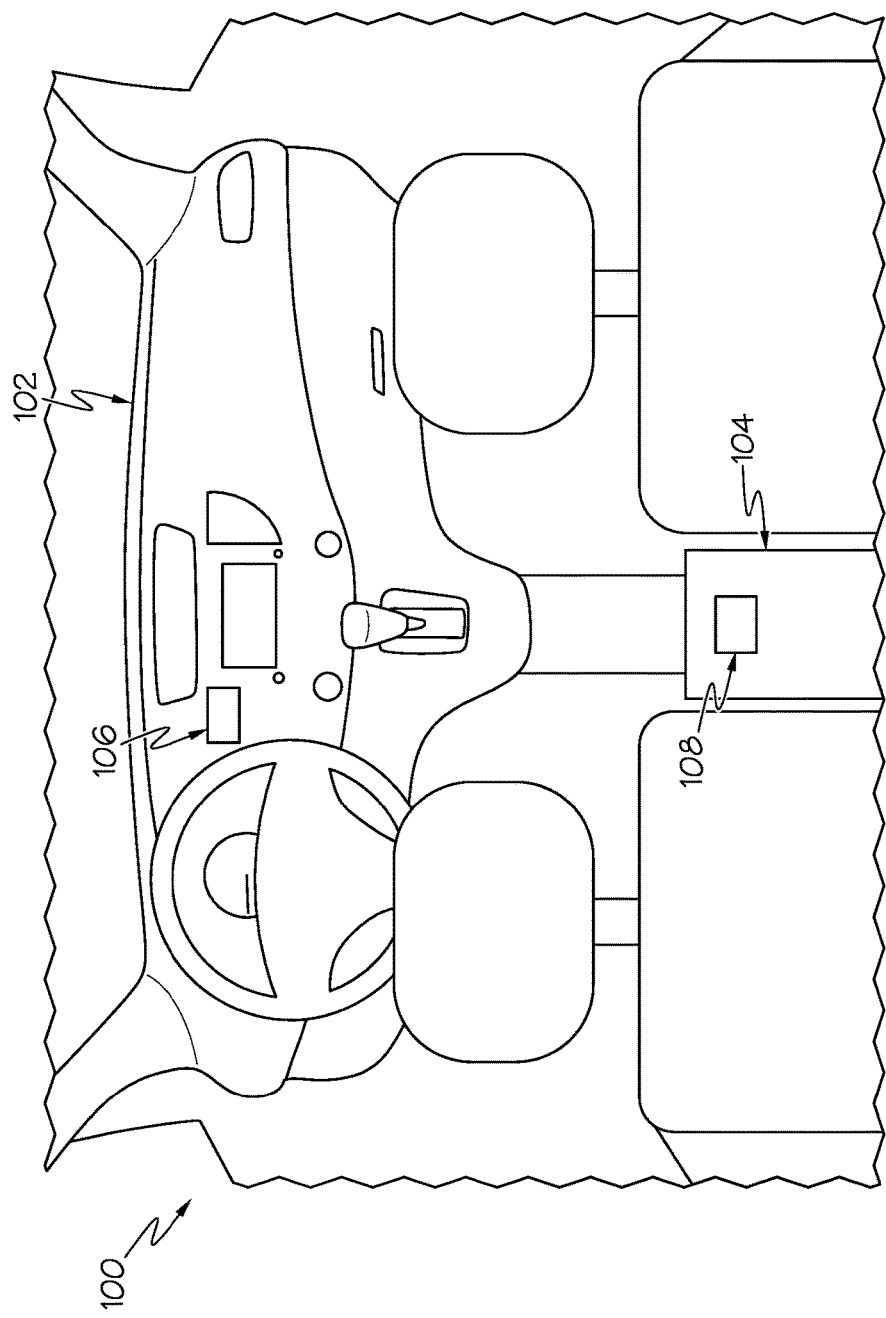
FIG. 1 depicts a vehicle interior of a vehicle, according to embodiments described herein.

Referring now to the drawings, FIG. 1 depicts a vehicle interior 100 of a vehicle, according to embodiments described herein. As illustrated, the vehicle interior 100 may include a dashboard 102 and a console 104. The dashboard 102 may be configured with the steering wheel, human-machine interface (HMI), glove compartment, and/or other components for providing functionality and convenience to the vehicle. Also provided on the dashboard 102 is a dashboard retractable storage apparatus 106. As discussed in more detail below, the dashboard retractable storage apparatus 106 may be integrated into the dashboard 102, such that when not in use, the dashboard retractable storage apparatus 106 may be substantially flush with the surrounding surface of the dashboard 102. When the dashboard retractable storage apparatus 106 is retracted, the components retract substantially laterally, relative to ground.

Also provided in FIG. 1 is a console retractable storage apparatus 108. The console retractable storage apparatus 108 may be integrated into the console 104 and may provide storage functionality similar to the dashboard retractable storage apparatus 106. It should be understood that, while the dashboard retractable storage apparatus 106 is configured to retract laterally, because the surface of the console 104 may be substantially parallel to ground, the console retractable storage apparatus 108 may retract substantially vertically relative to ground.

It should be understood that the retractable storage apparatus (whether the dashboard retractable storage apparatus 106 or the console retractable storage apparatus 108) may be configured to removably secure a mobile device, such as a mobile phone, tablet, global positioning device, camera, etc. Similarly, some embodiments may be configured to integrate with a separately attachable cup holder, change holder, or other accessory to expand the storage capabilities of the retractable storage apparatus. It should also be understood that while the embodiment of FIG. 1 depicts both the dashboard retractable storage apparatus 106 and the console retractable storage apparatus 108 in a single vehicle interior 102, this is also an example. Many embodiments may have more or fewer of these apparatuses.

Figure 2A:
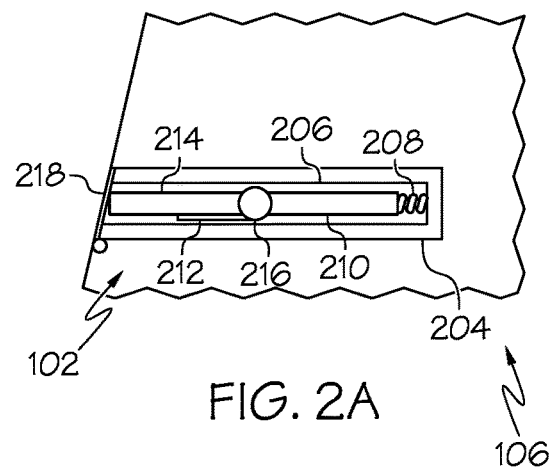
FIGS. 2A-2C depict dashboard retractable storage apparatus being retracted from a vehicle dashboard, according to embodiments described herein.
Figure 2B:
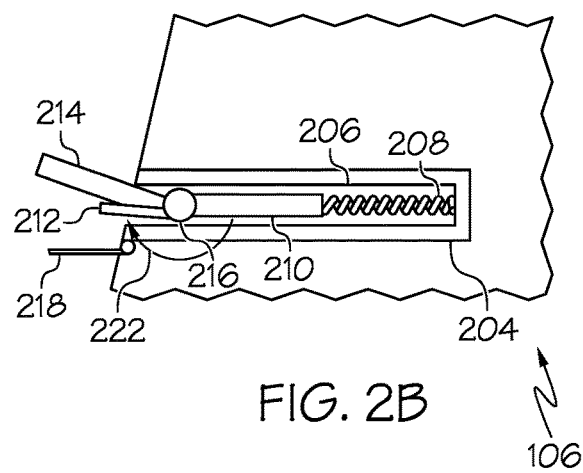
Figure 2C:
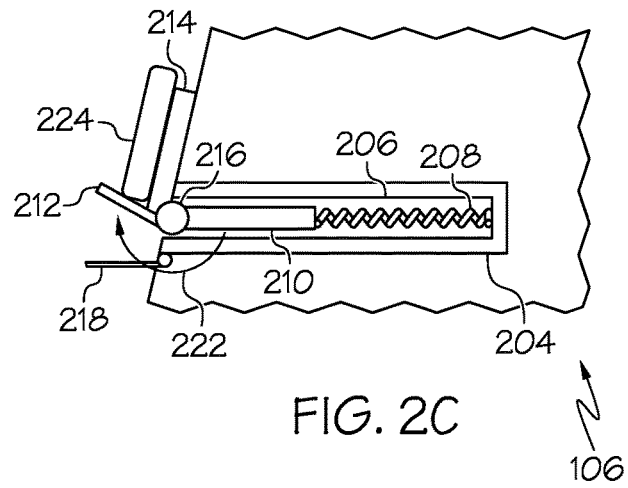

FIGS. 2A-2C depict a dashboard retractable storage apparatus 106 being retracted from the dashboard 102, according to embodiments described herein. As illustrated in FIG. 2A, the dashboard retractable storage apparatus 106 is inserted into a mechanism cavity 204 in the dashboard 102. Depending on the particular embodiment, the mechanism cavity 204 may be configured to be substantially perpendicular to the surface of the dashboard 102 and/or substantially parallel to ground. Into the mechanism cavity 204 the dashboard retractable storage apparatus 106 may be inserted, where the dashboard retractable storage apparatus 106 includes an apparatus frame 206, a retraction mechanism 208, an anchor component 210, a lower support 212, a back support 214, a hinge 216, and an apparatus cover 218.

The apparatus frame 206 may enclose the other components of the dashboard retractable storage apparatus 106, when the dashboard retractable storage apparatus 106 is disengaged (not retracted). The apparatus frame 206 may be secured inside the mechanism cavity 204 by an adhesive applied inside of the mechanism cavity 204; by physical anchors (such as screws) that couple the apparatus frame 206 to the mechanism cavity 204; by friction between the mechanism cavity 204 and the apparatus frame 206; etc. The apparatus frame 206 may be substantially rectangular in shape and may substantially fill the mechanism cavity 204 in length, width, and/or depth. While FIGS. 2A-2C depict the apparatus frame 206 as being substantially flush with the exterior surface of the dashboard 102, this is merely an example.

Also depicted is the retraction mechanism 208 that is coupled to the apparatus frame 206 and is also coupled to the anchor component 210. The retraction mechanism 208 is depicted in FIGS. 2A-2C as a spring, however, any mechanism that allows for a depressing of the dashboard retractable storage apparatus 106 into the dashboard 102 to engage and again inserting the dashboard retractable storage apparatus 106 back into the mechanism cavity 204 to secure the dashboard retractable storage apparatus 106 may be utilized. Some embodiments of the retraction mechanism 208 may include at least one electric motor that engage and disengage the dashboard retractable storage apparatus 106 in response to a user input or other selection of a user input device. The user input device may include a manual push button, where the user presses the apparatus cover 218 into the dashboard 102 or the console 104, thereby physically activating the retraction mechanism 208 and disengaging (or engaging) the dashboard retractable storage apparatus 106. In some embodiments, the user input device may include an electronic push button that is coupled to a motor that automatically engages or disengages the dashboard retractable storage apparatus 106.

Regardless, the retraction mechanism 208 is coupled to the anchor component 210. The anchor component 210, the lower support 212, and the back support 214 are coupled to a hinge 216. As illustrated in FIG. 2B, when the retraction mechanism 208 is activated, the retraction mechanism 208 begins to force the lower support 212 and the back support 214 out of the mechanism cavity 204. As also illustrated, the apparatus cover 218 may open (either prior to movement of the retraction mechanism 208 or due to force applied to the apparatus cover 218 by the back support 214.

As illustrated in FIGS. 2A-2C, the apparatus cover 218 is secured by a hinge to the dashboard 102 and rotates to an open position to allow the remaining portions of the dashboard retractable storage apparatus 106 to exit the mechanism cavity 204. While the apparatus cover 218 is depicted in FIGS. 2B and 2C as staying substantially perpendicular to the dashboard 102, this is also just an example. Some embodiments may provide that the apparatus cover 218 rotate to be substantially parallel to the dashboard 102 and/or to reinsert into the mechanism cavity 204 while the dashboard retractable storage apparatus 106 is engaged. Additionally, as described with reference to FIGS. 4A-4C below, some embodiments of the apparatus cover 218 may be coupled to the back support 214 and may function accordingly.

Regardless, as illustrated in FIGS. 2B and 2C, while the dashboard retractable storage apparatus 106 is exiting the mechanism cavity 204, the back support 214 begins to rotate along the direction of arrow 222. This rotation may be from about 90 degrees to about 200 degrees, depending on the embodiment and the position of the dashboard retractable storage apparatus 106 when disengaged. The hinge 216 may thus include a spring, a motor, and/or other mechanism for automatically rotating the back support 214. Lower support 212 also begins to rotate in the direction of the arrow 222. This rotation may be less than the rotation of the back support 214 because of the lower support 212 may be almost parallel relative to ground when disposed in the mechanism cavity 204. As illustrated in FIG. 2C, the lower support 212 and the back support 214 continue to rotate on the hinge 216 until an angle between the lower support 212 and the back support 214 reaches a point to adequately support a mobile device 224 or other object. In some embodiments, the angle may be about 90 degrees, while in other embodiments the angle may be less, such as about 30 degrees. This may also depend on the object to be received.

In the fully engaged configuration of FIG. 2C, the anchor component 210 may remain inside the mechanism cavity 204 to provide support for the portions of the dashboard retractable storage apparatus 106 and the mobile device 224 that is coupled to the dashboard retractable storage apparatus 106. In some embodiments the anchor component 210 may also have retractable arms or other mechanism to more fully secure the anchor component 210 to the apparatus frame 206 when engaged. A mobile device 224 may reside on the dashboard retractable storage apparatus 106.

Additionally, the dashboard retractable storage apparatus 106 may include retractable side supports 324a (depicted in more detail in FIG. 3). The retractable side supports 324a may retract upon exit of the mechanism cavity 204 and may provide additional support for the mobile device 224 or other object.

It should also be understood that the lower support 212 and/or the back support 214 may include or be coupled to a charging mechanism. The charging mechanism may include an inductive charging unit to charge a battery of the mobile device 224 or may provide an explicit charging connector to physically interface with a charging port of the mobile device 224. The charge power may be originate from an electrical power source of the vehicle, such as a vehicle battery, a cigarette liter, etc.

Figure 3A:
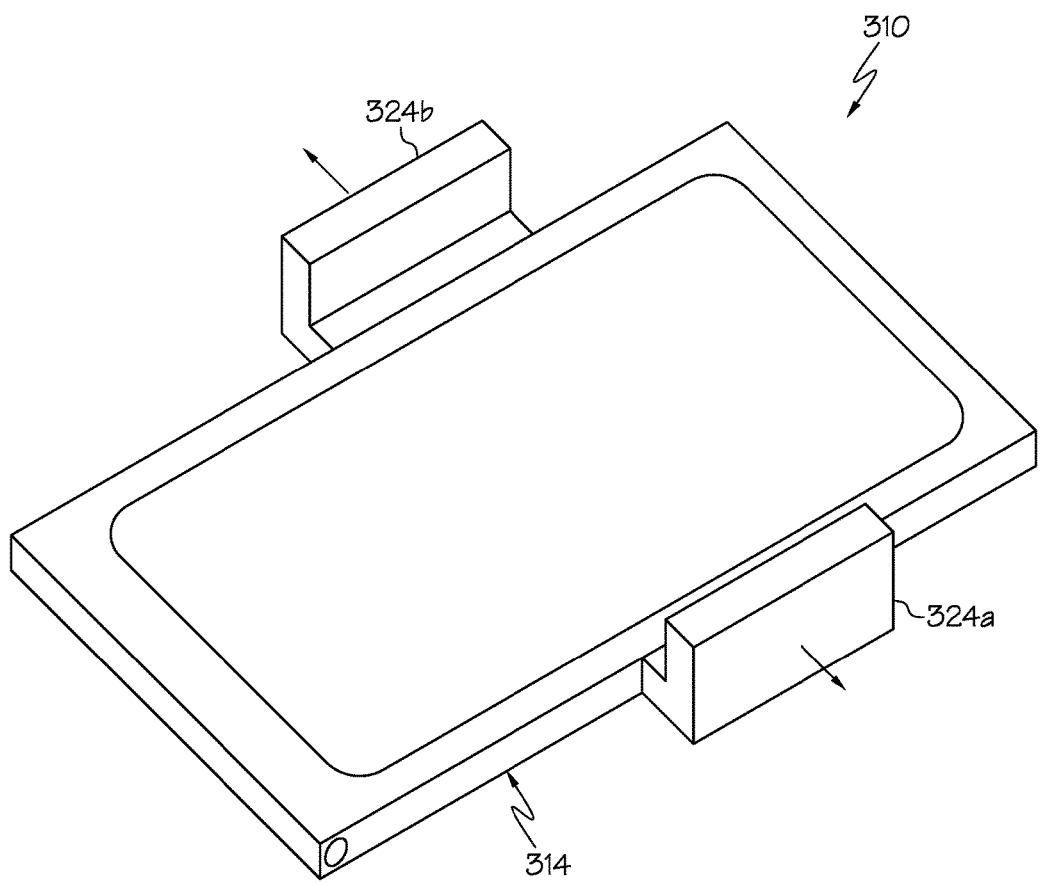
FIG. 3 depicts a portion of a retractable storage apparatus with retractable side supports, according to embodiments described herein.
Figure 3B:
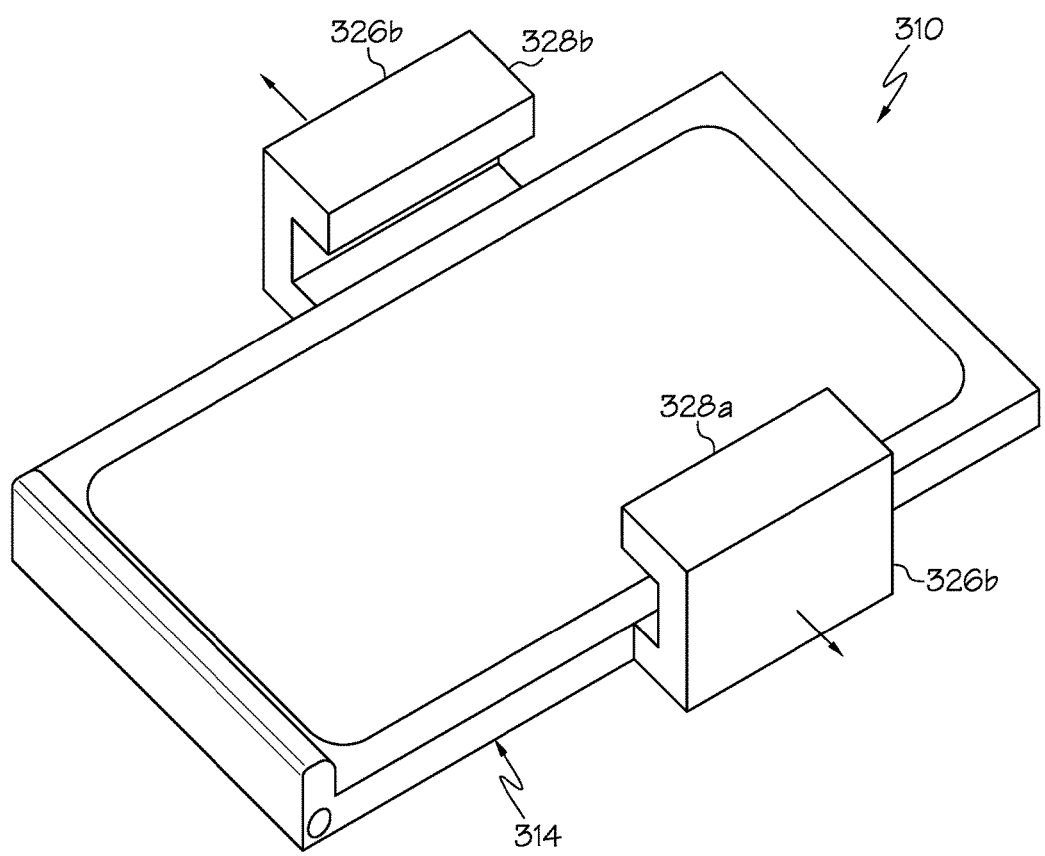

FIGS. 3A and 3B depict a portion of a retractable storage apparatus 310 with retractable side supports 324a, 324b, according to embodiments described herein. As illustrated, the retractable storage apparatus 310 in FIG. 3A is depicted separate from other components depicted in FIGS. 2A-2C or 4A-4C. Additionally, it should be noted that the retractable side supports 324a, 324b may be utilized for of the dashboard retractable storage apparatus 106 and/or the console retractable storage apparatus 108.

Accordingly, the retractable storage apparatus 310 may include a back support 314 that operates as described for back support 214 (FIGS. 2A-2C). However FIGS. 2A-2C depict a side view of the dashboard retractable storage apparatus 106 and thus the retractable side supports 324a, 324b are more clearly illustrated in FIGS. 3A and 3B. The retractable side supports 324a, 324b may be positioned on the back support 314 and may be substantially "L" shaped or substantially "C" shaped (as depicted in FIG. 3B) to receive and secure a mobile device 224 or other object. Referring back to FIG. 2B, when the retractable storage apparatus 310 (or 106) is exiting the mechanism cavity 204, the lower support 212 and the back support 214 may begin to rotate on the hinge 216. After a predetermined portion of the back support 214 has exited the mechanism cavity 204, the retractable side supports 324a, 324b may begin to extend outward (as depicted in the arrows in FIG. 3A). Thus the retractable side supports 324a, 324b may include a spring mechanism, motor, and/or other retraction mechanism to extend. Once retracted, some embodiments of the retractable side supports 324a, 324b may also provide inward force toward the back support 314 (opposite the direction of the arrows) to secure the mobile device 224 to the retractable storage apparatus 310. This inward resistance may be provided by locking mechanism, motor, or the like.

When the mobile device 224 is removed and/or the retractable storage apparatus 310 is disengaged and returned the mechanism cavity 204, the retractable side supports 324a, 324b may release the mobile device 224 (e.g. by moving in the direction of the arrows in FIG. 3A) and then returned into (or behind) the back support 314. The retractable storage apparatus 310 may then be folded back into a substantially parallel or coplanar configuration and returned to the mechanism cavity 204, as depicted in FIG. 2A.

As illustrated in FIG. 3B, the retractable side supports 326a, 326b are depicted as being substantially "C" shaped. The retraction of the retractable side supports 326a, 326b may operate similar to the retractable side supports 324a, 324b from FIG. 3A, except that the retractable side supports 326a, 326b include securing mechanisms 328a, 328b. In some embodiments, the securing mechanisms 328a, 328b may be stationary so that the mobile device 224 slides into the retractable storage apparatus 310. However, in other embodiments, the securing mechanisms 328a, 328b rotate away and/or toward the back support 314 to allow easy insertion and removal of the mobile device 224 for the retractable storage apparatus 310.

In these embodiments, the securing mechanisms 328a, 328b may lock into the position depicted in FIG. 3B and release when the mobile device 224 is to be removed. In some embodiments, the securing mechanisms 328a, 328b may extend and/or retract into the retractable side supports 326a, 326b to secure and release the mobile device 224. When the retractable storage apparatus 310 is being disengaged, the retractable side supports 326a, 326b and the securing mechanisms 328a, 328b may be returned to the state depicted in FIG. 3A and/or FIG. 3B. The back support 214 and the lower support 212 may be returned to the substantially parallel confirmation depicted in FIG. 2A and may be returned to the mechanism cavity 204. The retraction mechanism 208 may lock the retractable storage apparatus 310 into a locked position until the next use.

Figure 4A:
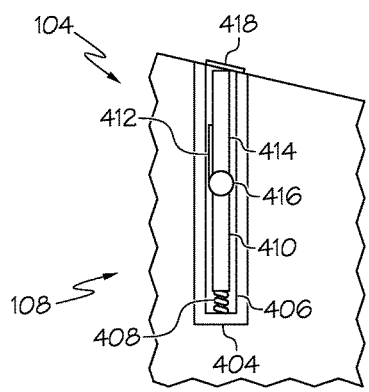
FIGS. 4A-4C depict a console retractable storage apparatus being retracted from a vehicle console, according to embodiments described herein.
Figure 4B:
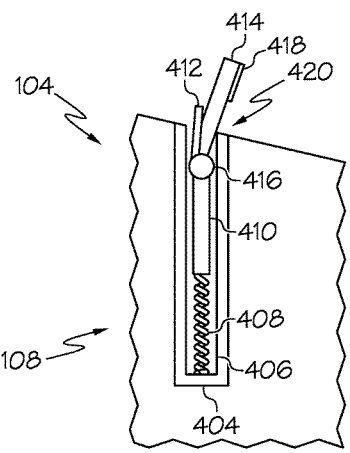
Figure 4C:
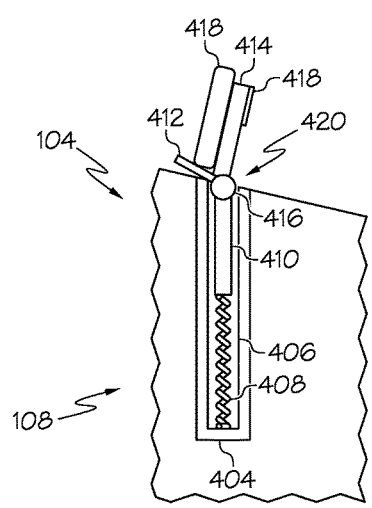

FIGS. 4A-4C depict a console retractable storage apparatus 108 being retracted from a console 104, according to embodiments described herein. While the dashboard retractable storage apparatus 106 of FIG. 2A is substantially parallel to ground when disengaged, FIG. 4A depicts a substantially perpendicular orientation (relative to ground) of the console retractable storage apparatus 108. Also similar to FIG. 2A, the embodiment depicted in FIG. 4A includes a mechanism cavity 404, in which the console retractable storage apparatus 108 resides when disengaged. The console retractable storage apparatus 108 includes an apparatus frame 406, a retraction mechanism 408, an anchor component 410, a lower support 412, a back support 414, a hinge 416, and an apparatus cover 418.

Accordingly, the console retractable storage apparatus 108 may operate similarly as the dashboard retractable storage apparatus 106. When the console retractable storage apparatus 108 is engaged (e.g., by pushing the console retractable storage apparatus 108 into the console 104 and/or by activating a motor that automatically engages the console retractable storage apparatus 108), the apparatus cover 418 may open. While in FIGS. 2A-2C, the apparatus cover 218 was coupled to the dashboard, the apparatus cover 418 is coupled to the back support 414. As such, in FIG. 4B, the apparatus cover 418 may rotate on the back support 414 (such as via a hinge) and may (or may not) slide to be flush with an end of the back support 414. Additionally, when the back support 414 exits the mechanism cavity 404 to a predetermined point, the back support 414 may rotate on the hinge 416. Because the original, disengaged configuration of the console retractable storage apparatus 108 was substantially vertical, the back support 414 need not rotate much, if at all. Depending on the particular embodiment, the back support 414 may rotate about zero degrees to about 45 degrees.

Additionally, while in the embodiment of FIGS. 2A-2C the lower support 212 rotated the same direction as the back support 214, in the embodiment of FIGS. 4A-4C, the lower support 412 rotates the opposite direction as the back support 414. Additionally, the retractable side supports 326a, 326b may also be included and may extend when the console retractable storage apparatus 108 is engaged.

To disengage the console retractable storage apparatus 108, a user may return the retractable side supports 326a, 326b, the lower support 412 and the back support 414 into the mechanism cavity 404. This may be performed manually or via a motorized solution that is activated by a user selection of an option.

As illustrated above, various embodiments of a retractable storage apparatus are disclosed. These embodiments may provide a convenient location to securely store a mobile device or other object. Additionally, because the retractable storage apparatus is integrated into a dashboard or console, the retractable storage apparatus may be disengaged back into the dashboard or console when not in use.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and apparatus for retractable storage. It should also be understood that these embodiments are merely exemplary and are not intended to limit the scope of this disclosure.

What is claimed is:

1. A retractable storage apparatus comprising:
   a hinge component;
   a back support disposed on a first side of the hinge component;
   a lower support disposed on the first side of the hinge component; and
   an anchor component that is disposed on a second side of the hinge component,
   wherein when the retractable storage apparatus is disengaged, the back support, the lower support, and the anchor component are substantially coplanar and disposed within a mechanism cavity, and
   wherein, in response to receiving a force directed into the mechanism cavity, the retractable storage apparatus is engaged such that the back support and the lower support independently extend from the mechanism cavity to expose the back support and the lower support, and
   wherein the back support and the lower support each rotate independently in different directions on the hinge component to receive a mobile device.

2. The retractable storage apparatus of claim 1, further comprising retractable side supports that extend from the back support.

3. The retractable storage apparatus of claim 2, wherein the retractable side supports are configured as at least one of the following: substantially L shaped and substantially C shaped.

4. The retractable storage apparatus of claim 1, further comprising an apparatus cover that is substantially flush with an opening of the mechanism cavity when the retractable storage apparatus is disengaged and opens the mechanism cavity to allow the retractable storage apparatus to engage.

5. The retractable storage apparatus of claim 1, wherein the retractable storage apparatus is integrated into at least one of the following: a vehicle dashboard and a vehicle console.

6. The retractable storage apparatus of claim 1, further comprising a charging mechanism for charging the mobile device.

7. The retractable storage apparatus of claim 1, further comprising a user input and an electric motor for disengaging the retractable storage apparatus.

8. The retractable storage apparatus of claim 7, wherein the user input and the electric motor are configured to engage the retractable storage apparatus.

9. A retractable storage apparatus comprising:
   a hinge component;
   a back support coupled to the hinge component;
   a lower support that is coupled to the hinge component;
   an anchor component that is coupled to the hinge component;
   a retraction mechanism for engaging and disengaging the retractable storage apparatus,
   wherein when the retractable storage apparatus is disengaged, the back support, the lower support, and the anchor component are substantially coplanar and disposed within a mechanism cavity; and
   a user input device that is coupled to the retraction mechanism, wherein, in response to receiving user input to engage the retractable storage apparatus, the back support and the lower support independently extend from the mechanism cavity, and
   wherein the back support and the lower support each rotate independently in different directions on the hinge component to receive a mobile device.

10. The retractable storage apparatus of claim 9, further comprising retractable side supports that extend from the back support.

11. The retractable storage apparatus of claim 10, wherein the retractable side supports are configured as at least one of the following: substantially L shaped and substantially C shaped.

12. The retractable storage apparatus of claim 9, further comprising an apparatus cover that is substantially flush with an opening of the mechanism cavity when the retractable storage apparatus is disengaged and opens the mechanism cavity to allow the retractable storage apparatus to engage.

13. The retractable storage apparatus of claim 12, wherein the apparatus cover is coupled to at least one of the following: the back support, a vehicle console, and a vehicle dashboard.

14. The retractable storage apparatus of claim 9, further comprising a charging mechanism for charging the mobile device.

15. The retractable storage apparatus of claim 9, wherein the user input device includes at least one of the following: a manual push button that physically engages the retraction mechanism and an electronic push button that activates a motor.

16. A vehicle comprising:
   a vehicle dashboard;
   a vehicle console; and
   a retractable storage apparatus that is coupled to at least one of the following: the vehicle dashboard and the vehicle console, wherein the retractable storage apparatus comprises:
   a hinge component;
   a back support coupled to the hinge component;
   a lower support that is coupled to the hinge component;
   an anchor component that is coupled to the hinge component;

retractable side supports that are coupled to the back support;

a retraction mechanism for engaging and disengaging the retractable storage apparatus, wherein when the retractable storage apparatus is disengaged, the back support, the lower support, and the anchor component are substantially coplanar and disposed within a mechanism cavity of the vehicle; and a user input device that is coupled to the retraction mechanism, wherein, in response to receiving user input to engage the retractable storage apparatus, the back support and the lower support extend independently from the mechanism cavity, and wherein the back support and the lower support each rotate independently in different directions on the hinge component, and the retractable side supports extend to receive a mobile device.

17. The vehicle of claim 16, wherein the retractable side supports are configured as at least one of the following: substantially L shaped and substantially C shaped.

18. The vehicle of claim 16, further comprising an apparatus cover that is substantially flush with an opening of the mechanism cavity when the retractable storage apparatus is disengaged and opens the mechanism cavity to allow the retractable storage apparatus to engage.

19. The vehicle of claim 18, wherein the apparatus cover is coupled to at least one of the following: the back support, the vehicle console, and the vehicle dashboard.

20. The vehicle of claim 16, further comprising a charging mechanism for charging the mobile device.

* * * * *